US006015295A

United States Patent [19]

Winks, Jr.

[11] Patent Number: 6,015,295

[45] Date of Patent: Jan. 18, 2000

[54] NATAL ZODIAC CHART

[76] Inventor: John Raymond Winks, Jr., 42 Rollingwood Dr., San Rafael, Calif. 94901

[21] Appl. No.: 09/103,088

[22] Filed: Jun. 23, 1998

[51] Int. Cl.[7] ............ B42D 15/00; G09B 29/00

[52] U.S. Cl. ............ 434/106; 283/115

[58] Field of Search ............ 283/115, 117; 434/106

[56] References Cited

U.S. PATENT DOCUMENTS

| | | | |
|---|---|---|---|
| 4,035,616 | 7/1977 | Piringer | 283/117 X |
| 4,117,608 | 10/1978 | Trenkle | 434/106 |
| 4,189,853 | 2/1980 | Provenzano | 434/106 |
| 4,193,213 | 3/1980 | Suda | 434/106 |
| 4,195,424 | 4/1980 | Heath | 434/106 |
| 4,219,944 | 9/1980 | Keenan | 434/106 |
| 4,306,141 | 12/1981 | Bailey et al. | 434/106 X |
| 5,273,320 | 12/1993 | Demacarty | 283/117 X |

*Primary Examiner*—John A. Ricci
*Attorney, Agent, or Firm*—Risto A. Rinne, Jr.

[57] ABSTRACT

An apparatus for presentation of astrological information includes a circular natal chart and a larger circular zodiac chart that are each attached to a bas. The zodiac chart includes a minimum diameter equal to or greater than the maximum diameter of the natal chart and a maximum diameter that is greater than its minimum diameter and is disposed concentrically in a predetermined alignment around the natal chart. A symbol for each desired celestial object, such as for each planet, the sun, and the moon are included along with a method for detachably attaching each of the symbols to the zodiac chart. According to a first embodiment, the base of the zodiac chart is formed of a flexible magnetic sheet material and each of the symbols are either ferrous or are themselves formed of a similar magnetic material. The symbols are each attached to the zodiac chart by the force of magnetic attraction that is developed intermediate each of the symbols and the zodiac chart. According to a second embodiment the zodiac chart includes a first part of a hook and loop fastener, such as is sold under the trade name "VELCRO", and each of the symbols includes a second part of the hook and loop fastener. The apparatus can itself be placed on a ferrous object, such as on a refrigerator, to which it will magnetically adhere or it can include a hook for suspension from a wall.

19 Claims, 1 Drawing Sheet

NATAL ZODIAC CHART

BACKGROUND OF THE INVENTION

1. Field of the Invention

The present invention, in general, relates to charts of the zodiac and, more particularly, to charts which show the zodiac in relation to the houses of a person's natal zodiac chart.

In astrology, the position of each of the heavenly bodies is believed to exert an influence on the characteristics and traits a person is likely to exhibit in life as well as the experiences he or she is likely to have and the meaning that is attributable to those experiences.

Basic astrological practices assess the current sign of the zodiac and the current position held by each of the important heavenly bodies, namely the sun, moon, and the planets, and then interpret this information for each sign of the zodiac. When this is done on a daily basis, it is commonly referred to as a daily horoscope.

The sign of the zodiac that a person receives and carries for his entire life is determined by the "sun-sign" of the zodiac at the time of his birth. However, the position of all of the celestial spheres at the time of birth is believed to be especially important.

The sun-sign is believed to greatly influence much about the person's life. Together, the combined position of all of the relevant celestial spheres at the time of his birth is believed to form a tapestry of interwoven influences that affect each person's personality and perhaps even his destiny. While the planetary positions at the time of birth for each person are of necessity omitted from simple daily horoscopes, they are nevertheless important to the individual.

When the position of the relevant celestial objects of the zodiac at the time of birth is printed on a chart, it is referred to as a "natal" chart, or to be more particular a "natal chart of the zodiac" and it is prepared for a person that is born at a given time and at a given location. It is both time and site specific.

Yet, it is believed, that the influences of the natal chart are not of themselves fixed in magnitude, but rather that they vary in accordance with the movements of the heavenly bodies. Each of the planets can always be placed in a certain sign of the zodiac relative to the earth or it is in transition from one sign to another. As the sun, moon, and all planets move with respect to the earth and because the earth is moving as well, these celestial bodies move in and out of the various signs of the zodiac.

Some of these bodies move quickly. For example, the moon moves through each sign of the zodiac in approximately two and one-half days. Planets like mercury move quickly while others, like Pluto, move at a slower pace staying in certain signs of the zodiac for extended periods of time. Therefore, though it is desirable to be able to know the current position of the planets as they relate to the signs of the zodiac, it is difficult to do so, especially economically.

Sometimes, the current position of these celestial objects will combine with those prevalent at the time of birth to either intensify or diminish certain traits or experiential tendencies that may be manifesting. When this happens it is useful for a practitioner of the astrological arts to know of such an occurrence so that he may be watchful of certain events in life and hopefully, forewarned, is able to make better life-decisions.

Therefore it is important for a practitioner of the astrological arts to know the position of the planets and other influential celestial objects at the time of his birth and also to know the influences brought about by their current positions.

It is difficult for an astrological practitioner to keep in his or her mind the positions of all of these celestial bodies at the time of his birth. It is even more challenging to be aware of their current positions, which unlike the natal positions, are in constant change. To look up this information in a table, such as an ephemeris, is useful to obtain planetary positions, but is lacking to the practitioner in meaning because he (or she) cannot visualize the positions of these spheres in relation to his (or her) personal natal chart.

What is needed is an apparatus that shows the natal chart of a practitioner relevant to the zodiac and which also shows, by symbolic representation, the current positions of the heavenly bodies so that by a glance, a moderately skilled practitioner can grasp the likely effects of natal astrological influences as they are combined with current astrological positions upon his or her life.

It does not matter if this is in fact true or not. What does matter is that a great many people believe that it is true and attribute credence to current astrological patterns and forecasts. In other words, they want this information and any device which provides this information is useful to the practitioner of these arts.

In fact, they want more than a general horoscope based on the date that they were born because this astrological component, namely the sun-sign, though significant is not all-encompassing in meaning because it is lacking the information and therefore the influences that are contained in each person's individual natal chart.

When the natal information is factored into the current zodiac it becomes tailored to the individual and is therefore especially relevant and valuable. Detailed information about the current positions of the planets, moon, and sun in relation to each person's natal chart is too specific to appear in any daily horoscope, such as is published in the newspaper. The individual who wishes to fully understand the astrological influences that are affecting his or her life, must find a way to accomplish this for themselves by somehow obtaining and then integrating all of this information. As was mentioned earlier tabular data, such as from an ephemeris, does not aid a practitioner in interpreting planetary positions. A graphical representation is considerably more useful.

The position of the planets, moon, and sun can be determined for any person based on any time of birth occurring at any location on the planet. These celestial positions, when properly shown on a circular or pie chart, produce the natal chart for the person and indicate the birth time as a "zero point" for the individual and also show the positions of the planets in relation to the zodiac at the time of birth. Natal charts also show the twelve "houses" as they apply to each person. Computer software programs are presently available which can generate and print charts that reveal this information.

As the zodiac is based on the number twelve, there are twelve houses that each person will have. The twelve houses will be displaced from the actual transition points of each of the signs of the zodiac to the exact degree that the zero point is offset from the transition point. If, for example, a person was born the same instant that a new sign of the zodiac started, then his "zero point" would align perfectly with the start of that sign and each of his houses would also align perfectly with each of the twelve signs of the zodiac. He would be said to have been born on the cusp of that particular sign of the zodiac.

Most people, not being born on a cusp, have their houses shifted to some extent with respect to the signs of the zodiac. Therefore, it is useful to combine the zodiac with the natal chart in such a way as to provide a visual indication of the shift between the houses of a person and signs of the zodiac.

It is helpful for a practitioner to know the position of the zero point and all of the houses with respect to the zodiac. This would also provide more information for assessment and interpretation. When combined with the planetary positional information of the natal chart and also their current positions, a chart which graphically shows pertinent astrological information would be obtained that is especially useful.

It would also be helpful if the information in such a chart could be easily updated to reflect current positional data as it changes on a day-to-day basis. It would also be helpful if such a chart could be displayed where desired and especially in locations where it can be easily seen. Furthermore, it would be advantageous if such a chart were economical to produce and if did not require the use of residential electrical power to operate.

Accordingly there exists today a need for a natal zodiac chart that shows the natal chart of a user as it relates to the zodiac and which allows for the symbolic positioning of the relevant celestial objects showing their current positions in relation to the natal chart and the zodiac.

Clearly, such an apparatus would be a useful and desirable device for a practitioner of astrology.

2. Description of Prior Art

Zodiac charts and natal charts are, in general, known.

While the structural arrangements of the already known types of charts, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a natal zodiac chart that is easy to use.

It is an important object of the invention to provide a natal zodiac chart that is inexpensive to manufacture.

It is also a significant object of the invention to provide a natal zodiac chart that does not require the use of residential electrical power to operate.

Another object of the invention is to provide a natal zodiac chart that provides a visual indication of the current positions of the astrological bodies in the zodiac.

Still another object of the invention is to provide a natal zodiac chart that permits changing of the current positions of the astrological bodies in the zodiac as frequently as is desired by the user.

Still yet another object of the invention is to provide a natal zodiac chart that can be attached to a refrigerator.

Yet another important object of the invention is to provide a natal zodiac chart that can be attached to a wall.

Briefly, a natal zodiac chart apparatus that is constructed in accordance with the principles of the present invention has a circular natal chart with a larger circular zodiac chart disposed concentrically around and proximate to the natal chart. A symbol for each celestial object that is desired, such as for each planet, the sun, and the moon are included. Means for detachably attaching each of the symbols to the zodiac chart are also included. According to a first embodiment, the zodiac chart is magnetic and each of the symbols are either ferrous or are themselves magnetic and so are detachably attached by the force of magnetic attraction where desired to the zodiac chart. According to a second embodiment the zodiac chart includes on the surface thereof a first part of a hook and loop fastener, such as is sold under the trade name "VELCRO", and each of the symbols includes a corresponding second part of the hook and loop fastener. The natal zodiac chart can itself be placed on a ferrous object, such as on a refrigerator, to which it will magnetically adhere in a convenient location or it can include a hook or an adhesive backing for suspension from a wall. If desired, the natal chart can also be formed of a magnetic material to aid in the adhesion of the natal zodiac chart to the ferrous object. The natal chart is typically printed on a sticky-back type of paper. Preferably, the zodiac and the natal chart each include a base that is formed of a magnetic sheet material. The sticky-back paper backing is removed from the natal chart and from the zodiac chart and they are placed in proper alignment with respect to each other on the magnetic sheet material base.

DETAILED DESCRIPTION OF THE INVENTION

Figure 1:
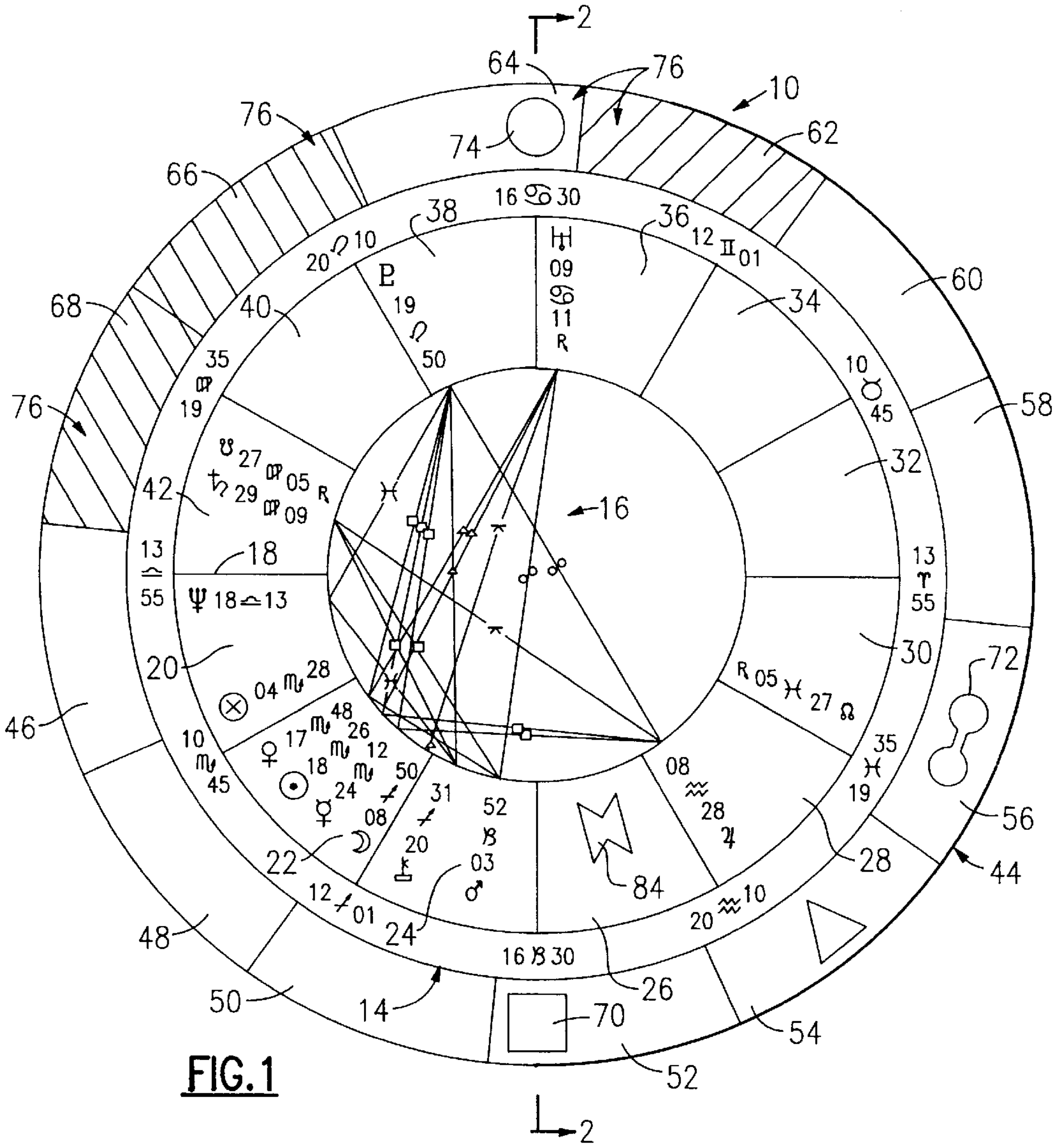
FIG. 1 is a front elevational view of a natal zodiac disk.
Figure 2:
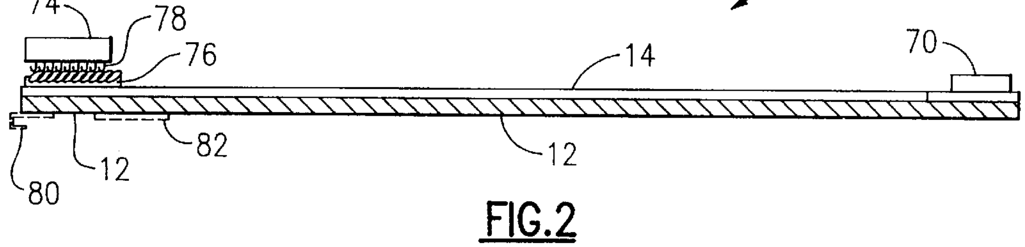
FIG. 2 is a cross sectional view taken on the line 2—2 in FIG. 1.

Referring to FIG. 1 and to FIG. 2 is shown, a natal zodiac chart, identified in general by the reference numeral 10.

The natal zodiac chart 10, according to a first embodiment, consists of a flexible magnetic sheet 12 of material having a predetermined diameter that serves as a base upon which all other parts, as are described in greater detail hereinafter, are placed.

The natal zodiac chart 10 includes component parts that are generic for all natal zodiac charts 10, such as the flexible magnetic sheet 12 (providing they are constructed according to the first described embodiment). Other component parts, which are described in greater detail hereinafter, are printed individually for a particular person (not shown) and take into account the exact time and place of the person's birth. Therefore, each complete natal zodiac chart 10 is unique for each person.

The material that is used for the flexible magnetic sheet 12 is well known and is commonly used in the manufacture of "refrigerator magnets" (not shown). A circular disc is cut to the overall size that is desired for the natal zodiac chart 10.

An inner circular natal chart, identified in general by the reference numeral 14, includes a series of inner circles or rings, the most inner one having printed thereon the position of the planets and other pertinent celestial objects as they were disposed at the time of birth for a particular person and is identified, in general, by the reference numeral 16. Only an outer-most ring is not part of the natal chart 14 and this is described in greater detail hereinafter (see reference numeral 44).

The position of the planets 16 is shown in the inner most ring and includes a grouping of lines that approach specific locations in any of twelve houses 20–42, which are described in greater detail hereinbelow. Any of the lines may include a symbolic image to help identify its meaning, as is well known in accordance with common astrological practices.

A zero point line 18 represents the time when the person for whom the chart 10 is prepared was born and is printed on the natal chart 14. The twelve houses 20–42 relate specifically to each person for whom the natal chart 14 is made and are printed thereon along with any other information that is desired to be shown or otherwise included to help the person, who is presumed to be a practitioner (adherent) of the astrological arts.

The twelve houses 20–42 are formed by dividing a portion of the natal chart 14 that consists of an intermediate ring into twelve segments, each segment being of equal length. The twelve houses 20–42 begin by moving counter-clockwise from the zero point line 18 with a first house 20 and end with the twelfth house 42.

The natal chart 14 is preferably printed on self-adhesive paper using either a laser printer (not shown) or, if preferred, a color printer (not shown). The protective backing paper that is commonly used with self-adhesive types of paper is removed and the printed natal chart 14 is then attached to the center of the flexible magnetic sheet 12 to which it adheres (sticks).

An outer zodiac ring, identified in general by the reference numeral 44, includes an outer-most ring that is concentrically disposed around the natal chart 14. The zodiac ring 44 forms a circular zodiac chart that includes a minimum diameter that is equal to or greater than the maximum diameter of the natal chart and a maximum diameter that is greater than its minimum diameter.

The zodiac ring 44 is either a separate ring that is also printed on sticky back paper or it is printed on a single piece of sticky back paper that also includes the natal chart 14 as its center portion. In either case, the zodiac ring 44 is applied to the flexible magnetic sheet 12 as was described above for the natal chart 14 whilst ensuring that it concentrically surrounds the natal chart 14.

The zodiac ring 44 includes the twelve well known signs of the zodiac 46–68 which are formed by dividing the zodiac ring 44 into twelve segments of equal length. The first of the twelve signs 46 correspond to the sign of the zodiac that was active when the person was born and it aligns with the natal chart 14 so as to have the zero point line 18 point to the precise spot in the first sign 46 that corresponds to the moment when the person was born.

The zodiac ring 44 must, therefore, be carefully oriented with respect to the natal chart 14 so that proper alignment occurs. Ideally, a computer program (not shown) will be developed which will allow either the laser printer or the color printer to print the natal chart 14 and the zodiac ring 44 concurrently and in proper alignment with respect to each other.

According to a modification of the first embodiment, only the zodiac ring 44 has as its base the magnetic sheet material 12 as was described hereinabove. This modification, though not preferred, saves by reducing the amount of magnetic sheet material 12 that is required.

The zodiac ring 44 must include a way to attach and then detach any of a series of symbols, identified by the reference numerals 70–74, thereto. The symbols 70–74 represent those astrological celestial objects which are desirable to track by indicating their current positions in the zodiac. Therefore, more than the three symbols 70–74 as shown herein are likely to be used and no limitation as to their number or shape is to be inferred by either the number or the shape of the symbols 70–74 that are used herein.

Ideally, each of the symbols 70–74 will have a predetermined shape or pattern printed thereon that helps a practitioner of the astrological arts determine which celestial object is being referred to. A great deal of creativity is obviously reserved for this purpose.

A first symbol 70 is shown attached on top of the fourth sign of the zodiac 52 on the zodiac ring 44. The first symbol 70 is formed either of a ferrous material or is itself formed of the same type of material that is used to make the flexible magnetic sheet 12.

As shown in the drawings, the first sign 46 through the eighth sign 60 of the zodiac ring 44 are formed of the flexible magnetic sheet 12 material. The first symbol 70 may be readily attached anywhere thereto or it may be readily removed therefrom and reattached elsewhere, as desired.

The first symbol 70 is placed on the zodiac ring 44 where a celestial object (sun, moon, or planet) that it represents is disposed in the zodiac at any given time. Depending upon the object that it represents, the first symbol 70, or any of a remaining second symbol 72 and a third symbol 74 are moved as frequently as is necessary or as is desired.

Typically, the symbols 70–74 are updated on a daily basis to indicate the current positions of the celestial objects in the zodiac by moving them to their proper positions in the zodiac ring 44. This positional information is important to the practitioner because it provides visual information concerning the positions of these objects as they relate to the zodiac.

This information can therefore be obtained by a glance at the zodiac ring 44. As a consequence of their positions, the placement of the symbols 70–74 also provides, by inference, information about the influences that they (the celestial objects) are believed to be exerting upon the life of the practitioner.

This real-time information about the positions of the celestial objects, when combined with the individual-specific information as is printed on the natal chart 14, provides significant synergistic information to the practitioner.

The practitioner can note, for example, when the position of a certain planet aligns with the position of that same planet at the time of his birth. This alignment may have meaning that one knowledgeable in the astrological arts can divine. It may mean, for example, that certain behavioral tendencies of the practitioner, which are attributed to the influence exerted by that particular planet, are intensified in the life of the practitioner at this time.

Without a knowledge of the natal planetary positions combined with simultaneous current planetary positional data, an awareness regarding their combined effects would be unavailable for the practitioner to use.

Accordingly, by providing a visual indication of both current and natal factors simultaneously, a method is provided which allows the practitioner to fully consider the astrological influences that are believed to be affecting his or her life at any given moment in time.

In this manner, the natal zodiac chart 10 functions as a comprehensive real-time symbolic representation of the important astrological factors of the zodiac that is tailored specifically to the life of the practitioner. As such, the natal zodiac chart 10 provides more comprehensive information to the practitioner than is available from a daily horoscope, which only considers the influence of the sun-sign, or birth-sign, of the practitioner.

Of course, if desired, the symbols 70–74 may remain fixed in position on the zodiac to indicate the astrological influences that were present for some auspicious occasion, such as on a wedding day of the practitioner or on a day the practitioner became employed in a particular position. Thus, the natal zodiac chart can also serve as an astrological memento.

The second symbol 72 is of a predetermined size and shape and is similarly constructed as is the first symbol 70 while having its own unique appearance so as not to be confused with the first symbol 70. The second symbol 72 is shown on the fourth sign 52 of the zodiac ring 44 to which it is held in place by magnetic attraction. It can be removed and placed where desired on the zodiac ring 44.

The ninth sign 62 through the twelfth sign 68 of the zodiac ring 44, as shown, include a first part 76 of a hook and loop fastener such as is sold under the tradename "VELCRO" to indicate a second possible embodiment of the invention. The third symbol 74 includes a second part 78 of the hook and loop fastener attached to the underside thereof. The third symbol 74 is shown attached on the tenth sign 64 of the zodiac ring 44. It can be readily removed from there and attached to the zodiac ring 44 where desired providing, of course, that the hook and loop fastener is present.

If this type of attachment (use of a hook and loop fastener) of the symbols 70–74 is desired, the VELCRO is used around the entire zodiac ring 44 and also with each of the symbols 70–74.

Conversely, if magnetic attachment is preferred, the VELCRO is omitted from both the zodiac ring 44 and also from each of the symbols 70–74. Instead of the VELCRO, the magnetic sheet material 12 is used.

If desired, the VELCRO can be placed on top of the magnetic sheet material 12 where it is used to secure the symbols 70–72. The magnetic sheet material is still needed if it is desirable to be able to attach the natal zodiac chart 10 to the ferrous object, such as to the refrigerator.

If the chart 10 is instead to be hung onto a wall (not shown), the flexible magnetic sheet material can be eliminated if desired, the VELCRO can be used to attach the symbols 70–74 to the zodiac ring 44, and a hook 80 can be attached to the underside (back) of the chart 10 for hanging it onto the wall.

The hook 80 is shown in dashed lines to indicate that its use is optional. The hook 80 can, if desired, be a loop of wire or cord that can be placed around a nail (not shown) that is attached to the wall. If desired, the hook is eliminated and an adhesive strip 82, also shown in dashed lines, is placed on the back of the chart 10 for attachment to the wall or to an object (not shown).

Various modifications are anticipated to be made to the natal zodiac chart that will naturally follow as a result of the disclosure contained herein. For example, a modified natal zodiac chart (not shown) having a modified zodiac chart (not shown) disposed at the center that is surrounded by a modified natal chart (not shown) is anticipated as one possible modification where each of the symbols 70–74 are detachably attachable with respect to the modified zodiac chart portion.

To illustrate this particular modification, a center symbol 84 is shown disposed in the fourth house 26 of the natal chart 14 and is magnetically detachably attached thereto. For purposes of illustration, assume for a moment that the natal chart 14 is the modified zodiac chart and that the center symbol 84 represents one of the celestial objects whose position in the zodiac is to be shown in the modified zodiac chart and updated periodically.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A natal zodiac chart for use in the astrological arts, comprising:

(a) an inner circular chart adapted to provide a first information;

(b) an outer circular chart adapted to provide a second information, said outer circular chart disposed concentrically around said inner circular chart and proximate thereto;

(c) a plurality of symbols for placement where desired on said outer circular chart;

(d) means for detachably attaching each of said plurality of symbols to said outer circular chart; and (e) a base adapted to support at least one of said inner circular chart and said outer circular chart, said base formed of a flexible magnetic sheet.

2. The natal zodiac chart of claim 1 including a sheet of paper upon which said first information is printed, said sheet of paper being attached to said base.

3. The natal zodiac chart of claim 2 wherein said sheet of paper includes an adhesive backing.

4. The natal zodiac chart of claim 1 wherein said first information includes a representation of the position of certain celestial objects at the time of birth of a person.

5. The natal zodiac chart of claim 1 wherein said first information includes a portion of said inner circular chart that is divided into twelve sections, each of said twelve sections being representative of a house of the zodiac of a person.

6. The natal zodiac chart of claim 1 wherein said flexible magnetic sheet includes means for attaching said natal zodiac chart to a ferrous object.

7. The natal zodiac chart of claim 6 wherein said means for attaching includes magnetic means.

8. The natal zodiac chart of claim 1 including a hook attached to said natal zodiac chart said hook adapted for hanging said chart on a wall.

9. The natal zodiac chart of claim 1 wherein said second information includes dividing said outer circular chart into twelve segments, each of said twelve segments being representative of a sign of the zodiac.

10. The natal zodiac chart of claim 9 wherein said outer circular chart is disposed in a predetermined alignment with respect to said inner circular chart.

11. The natal zodiac chart of claim 1 wherein said means for detachably attaching includes magnetic means.

12. The natal zodiac chart of claim 11 wherein said outer circular chart is formed of a flexible magnetic sheet material and each of said plurality of symbols is formed of a ferrous material.

13. The natal zodiac chart of claim 11 wherein said outer circular chart is formed of a flexible magnetic sheet material and each of said plurality of symbols is formed of a flexible magnetic sheet material.

14. The natal zodiac chart of claim 1 wherein said means for detachably attaching includes a hook and loop fastener.

15. The natal zodiac chart of claim 14 wherein said outer circular chart includes a first part of a hook and loop fastener attached to the surface thereof and each of said plurality of symbols includes a second part of said hook and loop fastener attached to a surface thereof.

16. The natal zodiac chart of claim 1 wherein each of said plurality of symbols is of a predetermined shape.

17. The natal zodiac chart of claim 1 wherein each of said plurality of symbols represents a celestial object that is used in the astrological arts.

18. A method for providing astrological information, comprising:

(a) providing a circular natal chart showing astrological information at the time of birth for a person;

(b) providing a circular chart of the zodiac showing current astrological information;

(c) aligning said chart of the zodiac concentrically with respect to said natal chart; and (d) providing at least one symbol of an astrologically significant celestial object that is detachably attachable to said chart of the zodiac.

19. A natal zodiac chart for use in the astrological arts, comprising:

(a) an inner circular chart adapted to provide a first information;

(b) an outer circular chart adapted to provide a second information, said outer circular chart disposed concentrically around said inner circular chart and proximate thereto;

(c) a plurality of symbols for placement where desired on said inner circular chart;

(d) means for detachably attaching each of said plurality of symbols to said inner circular chart; and (e) a base adapted to support at least one of said inner circular chart and said outer circular chart, said base formed of a flexible magnetic sheet.

* * * * *